United States Patent [19]

Bauer et al.

[11] Patent Number: 5,544,643
[45] Date of Patent: Aug. 13, 1996

[54] METHOD FOR SAVING DUCTILE FROM MATERIAL HAVING A CONCRETE LINING

[75] Inventors: Günter Bauer, Stuttgart, Germany; Rudolf Breu, Arbon, Switzerland

[73] Assignee: C&E Fein, GmbH & Co., Stuttgart, Germany

[21] Appl. No.: 254,033

[22] Filed: Jun. 3, 1994

[30] Foreign Application Priority Data

Jul. 7, 1993 [DE] Germany ............ 43 22 544.6

[51] Int. Cl.⁶ ............................................. B28D 1/06
[52] U.S. Cl. ............................. 125/12; 125/22; 451/540
[58] Field of Search ............................. 125/12, 13.01, 125/13.02, 18, 22; 451/540, 541, 544, 558, 552, 553

[56] References Cited

U.S. PATENT DOCUMENTS

| | | | |
|---|---|---|---|
| 2,973,576 | 3/1961 | Hentke | 30/371 |
| 3,674,447 | 7/1972 | Bellis . | |
| 3,869,263 | 3/1975 | Greenspan | 451/540 |
| 3,973,925 | 8/1976 | Asaeda et al. | 51/295 |
| 4,114,322 | 9/1978 | Greenspan | 451/540 |
| 4,187,828 | 2/1980 | Schmid | 125/18 |
| 4,517,867 | 5/1985 | Fuminier | 30/94 |
| 4,531,288 | 7/1985 | Aubriot | 30/99 |
| 4,883,500 | 11/1989 | Deakins et al . | |

FOREIGN PATENT DOCUMENTS

| | | |
|---|---|---|
| 1013558 | 7/1977 | Canada . |
| 0004449 | 3/1979 | European Pat. Off. . |
| 3433729 | 3/1986 | Germany . |

OTHER PUBLICATIONS

Patent Abstracts of Japan, vol. 15, No. 244 (M–1127) Jun. 24, 1991 & JP–A–03 079 219 (Nachi Fujikoshi Corp) Apr. 4, 1991.

Printout of Derwent WPI database file record containing an English language abstract for DE 34 33 729.

*Primary Examiner*—M. Rachuba
*Attorney, Agent, or Firm*—Weil, Gotshal & Manges LLP

[57] ABSTRACT

A saw blade possesses a base element onto which boron nitride particles are applied in the cutting region. The boron nitride particles are bonded by means of a metallic bonding layer, which preferably consists of nickel or a nickel alloy with a Vickers hardness of at least 600 HV. The bonding layer is preferably deposited galvanically. The boron nitride particles advantageously possess a particle size of approximately 0.5 to 0.8 mm, preferably approximately 0.6 to 0.7 mm. The saw blade possesses particular advantages for use as a reciprocating saw blade for sawing GGG cast iron pipes with a cement lining and fiber-reinforced cement jacket, resulting in considerably improved cutting performance and service life.

15 Claims, 2 Drawing Sheets

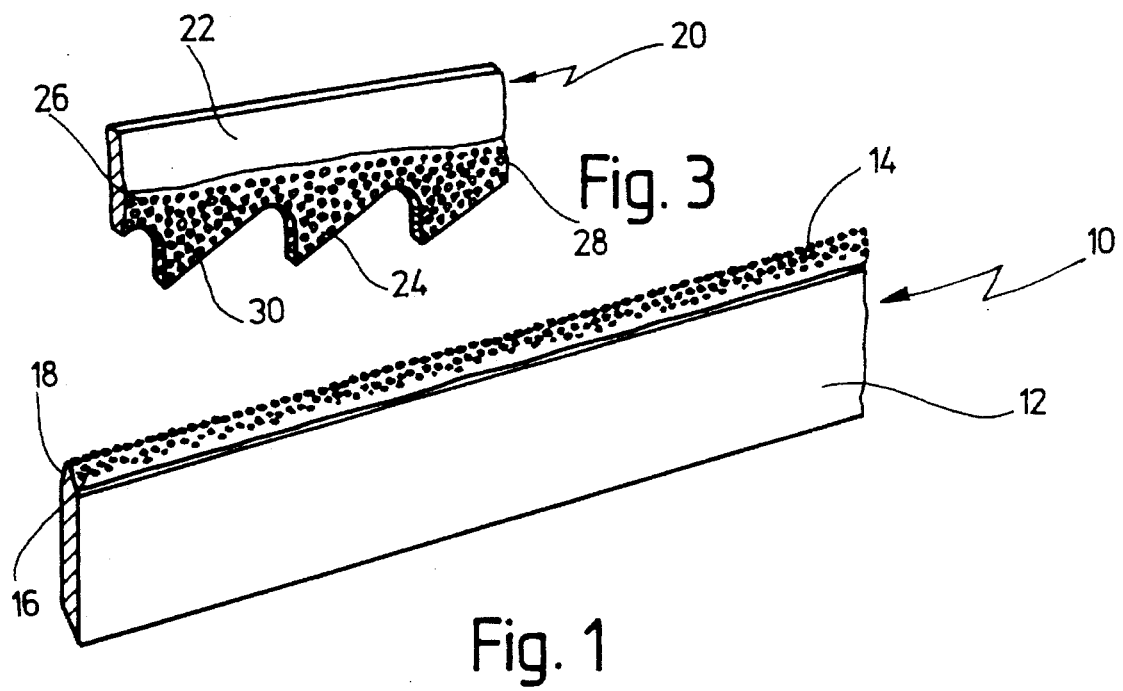
Fig. 3
Fig. 1
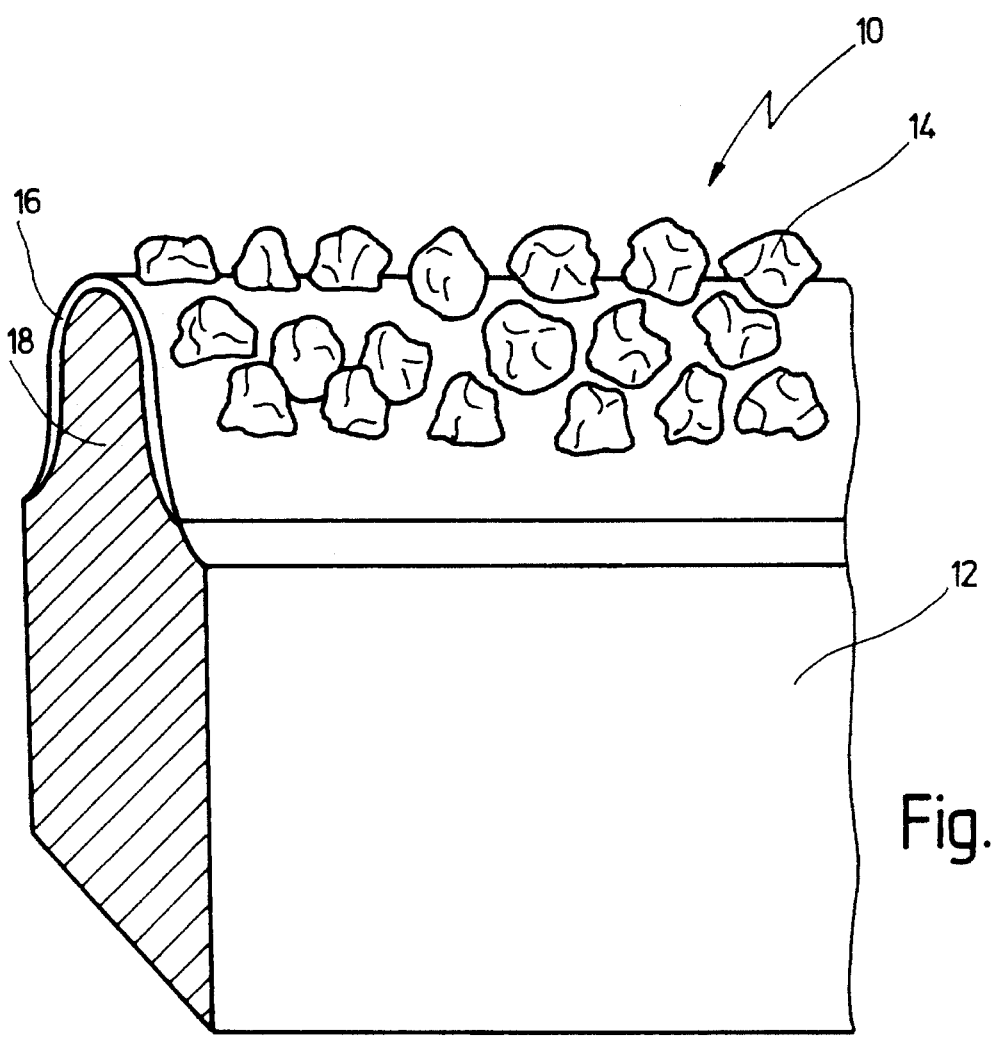
Fig. 2

METHOD FOR SAVING DUCTILE FROM MATERIAL HAVING A CONCRETE LINING

BACKGROUND OF THE INVENTION

1. Field of the Invention

The invention concerns a saw blade for sawing ductile iron materials having a concrete lining, having a base element onto which a coating made of particles of hard material is applied. The invention also concerns a method for sawing pipes made of cast iron having a concrete lining.

2. Background

Pipes that supply water and carry off waste water are at present produced mostly from cast iron, and are additionally provided with a cement lining. To improve corrosion resistance, these pipes are often additionally coated on the outside with a layer of fiber-reinforced cement or concrete. The cast iron is generally cast iron with spheroidal graphite (GGG), in which carbon in the form of spheroidal graphite is enclosed in a basic structure that is usually predominantly ferrite or perlite.

Sawing such pipes, which usually possess a diameter on the order of from approximately 15 to approximately 40 cm and more, is highly problematical. Reciprocating saws are often used because of the confined conditions, especially when pipes are being laid or repaired in situ.

However, conventional saw blades coated with tungsten carbide have insufficient service life, and often become so deformed while cutting through a single pipe that it is no longer possible to continue working with the same blade.

Diamond-coated saw blades are also unsuitable, since they have a tendency to smear because of the graphite particles contained in the gray cast iron, so that cutting performance is insufficient and the saw blades quickly deform because of the high applied pressure required.

The sawing process is further complicated by the fact that in the repair of water pipes, small quantities of water continue to flow through the pipe despite complete shutoff of the water; this means that working conditions are wet, which causes caking of the cement at the cut.

SUMMARY OF THE INVENTION

Objects

The underlying object of the invention is therefore to create a saw blade for sawing ductile iron materials, especially for sawing pipes made of gray cast iron with a cement lining and an outer jacket made of fiber-reinforced cement or concrete, which possesses high cutting performance and the longest possible lifetime.

Summary

This object is achieved, according to the invention, by the fact that in a saw blade of the aforesaid kind, the particles of hard material are configured as boron nitride particles, and are bonded onto the base element by means of a metallic bonding layer.

Use of such saw blades results in considerably improved cutting performance and greatly increased service life.

Since conventional diamond-coated saw blades are unsuitable, this result is extremely surprising given the structural similarity of boron nitride and diamond.

Cubic boron nitride, which is also referred to as Borazon, is commonly used in the abrasives industry to produce sanding wheels, grinding disks, and the like, if diamond-coated grinding tools are unsuitable.

Boron nitride has not, however, hitherto been commonly used for saw blades, since diamond-coated saw blades normally possess a longer service life and higher cutting performance.

According to the invention, the particles of hard material used to coat a saw blade are boron nitride particles, which are bonded onto the base element by means of a metallic bonding layer.

It has been found, in accordance with the invention, that when the conventional plastic bonding layer is replaced by a metallic bonding layer, considerably improved resistance to abrasion, and therefore a longer service life, are achieved. Saw blades according to the invention yield greatly improved cutting results even when sawing GGG cast iron pipes with a cement lining and fiber-reinforced cement outer jacket, even in the especially problematical diameter range of approximately 20 cm; on the one hand, cutting performance is greatly enhanced, and on the other hand, service life is considerably improved. Surprisingly, saw blades according to the invention have no tendency to smear, even with nodular graphite iron having spheroidal graphite inclusions. Moreover, even when wet cast-iron pipes are sawn, caking of cement residues (from the cement lining or the outer envelope) in the saw blade is eliminated.

An advantageous development of the invention provides for the bonding layer to be made of nickel or a nickel alloy.

The advantage of this feature is that a bonding layer of this kind possesses particularly high toughness and hardness.

Advantageously, the bonding layer can be produced by cathodic/anodic galvanic means, or by wet chemical means.

Galvanic production of the bonding layer has the advantage of particularly good adhesion and reproducibility; production is also relatively economical.

Of course production by other means, for example flame spraying, would also be theoretically conceivable, but such a method is generally much more expensive.

When nickel or a nickel alloy is used as the bonding layer, the hardness can advantageously be set at a Vickers hardness of at least 400 HV.

A hardness of at least 500 VH is especially preferred; optimum results are obtained with a galvanically deposited bonding layer made of nickel, with a Vickers hardness of approximately 550 to 650 HV.

An advantageous development of the invention provides for the boron nitride particles to possess a particle size of approximately 0.3 to 1 mm; a particle size of 0.5 to 0.8 m, in particular 0.6 to 0.7 m, is especially preferred.

The use of such coarse boron nitride particles results, particularly in conjunction with the bonding layer made of nickel or a nickel alloy and especially in the aforementioned hardness range, in optimum cutting results when used as reciprocating saw blades to saw pipes made of cast iron with cement lining and fiber-reinforced cement jacket.

The base element can be made of a tool steel or different material.

Both straight and toothed saw blades lead to equally good results, in particular when used as reciprocating saw blades.

In addition, saw blades according to the invention can also be used advantageously as circular saw blades.

In a method for sawing cast-iron pipes, in particular for sawing GGG cast-iron pipes which may possess a cement lining and an outer sheath made of fiber-reinforced cement or concrete, according to the invention the saw blades described above are used in particular as reciprocating saw blades.

It is understood that the features mentioned above and those yet to be explained below can be used not only in the respective combination indicated, but also in other combinations or in isolation, without leaving the context of the present invention.

DESCRIPTION OF THE DRAWINGS

The invention will be explained in more detail below, on the basis of preferred exemplary embodiments and with reference to the drawings, in which:

FIG. 1 shows a section of a saw blade according to the invention, in a schematic depiction;

FIG. 2 shows a section of the saw blade according to FIG. 1, in an enlarged schematic depiction (not to scale);

FIG. 3 shows a section of a saw blade slightly different from FIG. 1, which is fitted with teeth;

SPECIFIC DESCRIPTION

Figure 4:
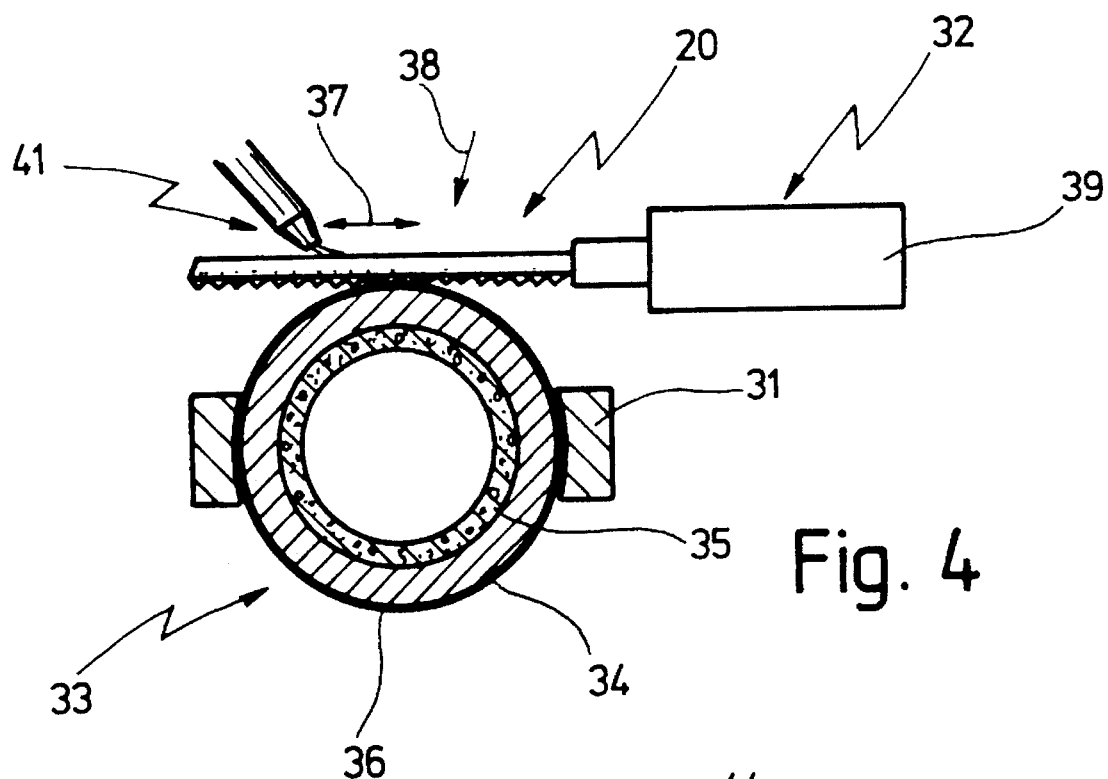
FIG. 4 shows a schematic representation of a pipe made from cast iron having an inner concrete lining and an outer fibre-reinforced synthetic lining which is clamped in position for sawing using a blade saw.

A saw blade according to the invention is designated in its entirety with the number 10 in FIGS. 1 and 2.

The saw blade 10 possesses an elongated base element 12 made of a tool steel, which is coated with boron nitride particles 14 in its cutting region 18, which in the example depicted is somewhat tapered compared to the remaining region of the base element 12.

The cutting region 18 possesses a thickness of approximately 2 to 2.5 mm, which has the advantage that the saw blade is sufficient broad that when large pipes are being sawn it is possible to work with wedges, thus preventing jamming of the saw blade.

The boron nitride particles 14, which are made of cubic boron nitride, possess a particle size of approximately 0.6 to 0.7 mm, which leads to particularly good cutting results when sawing GGG cast-iron pipes with a cement lining and fiber-reinforced cement jacket.

The boron nitride particles 14 are held on the cutting region 18 of the base element 12 by means of a bonding layer that is indicated schematically in FIG. 2 with the number 16.

This bonding layer 16 consists of a nickel layer that is deposited galvanically (anodically/cathodically), with a hardness of approximately 600 to 700 HV.

Corresponding to the thickness of the bonding layer 16, the boron nitride particles 14 have approximately 30 to 50% of their diameter projecting out of the bonding layer. The depiction in FIG. 2 serves only for explanation and is not to scale, since for purposes of better clarity the boron nitride particles 14 are shown enlarged. In FIG. 3, an alternative embodiment of a saw blade according to the invention is designated in its entirety with the number 20. Here again, a base element 22 made of a tool steel is coated in its cutting region with boron nitride particles, which are bonded by means of a galvanically deposited bonding layer made of nickel with a Vickers hardness of approximately 600 to 700 HV.

In contrast to the embodiment described previously, however, the cutting region 18 is not straight, but rather possesses teeth indicated with the number 30.

FIG. 4 shows a pipe denoted overall by reference numeral 33 in position for sawing using a blade saw according to the invention. The pipe 33 comprises a cast iron pipe 34 covered with an outer lining 36 made from fibre-reinforced synthetic material. In addition, the pipe 33 has an inner fibre-reinforced concrete lining 35.

The pipe 33 is clamped by a clamping means shown schematically by reference number 31. Preferably, the pipe is sawed by using a blade saw 32 having a blade 20 according to the invention (as depicted in FIG. 3) using a drive 39 back and forth as indicated by arrow 37. Simultaneously, the blade is advanced towards the pipe 33 as indicated by arrow 38. In addition, lubrication liquid may be applied as indicated by arrow 41. However, normally no additional lubrication liquid is necessary because of water leakage in such pipes.

Figure 5:
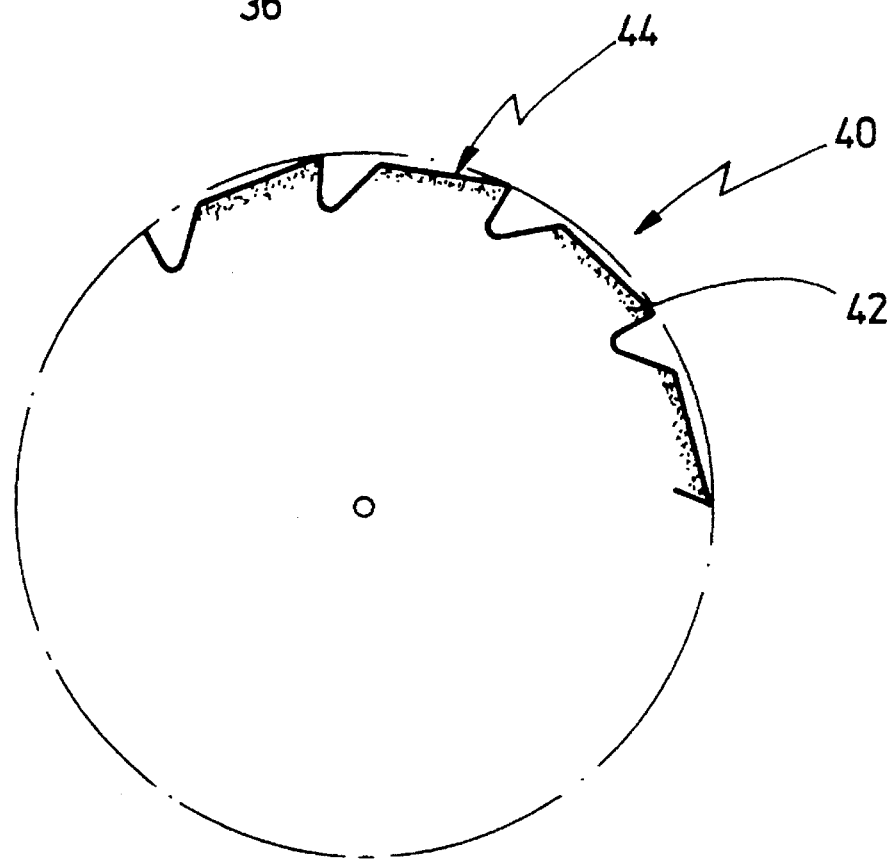
FIG. 5 an alternative configuration of the invention comprising a circular blade.

FIG. 5 shows an alternative configuration of the blade according to the invention. In FIG. 5 the blade denoted overall by reference numeral 40 is configured as a circular saw blade having teeth 44 having a coating with boron nitride particles 42 as described before.

We claim:

1. A method of cutting a pipe made of a ductile iron-based material and having a lining comprising a material made from one of a cement-based material and a fiber-reinforced material, the method comprising sawing the pipe with a saw blade comprising a metallic base element and a cutting region disposed along an edge of said base element, said cutting region at least partially covered with a metallic coating in which a plurality of boron nitride particles are dispersed, said particles protruding at least partially outwardly from said coating.

2. The method of claim 1 wherein said metallic base element comprises an elongated member and said cutting region is disposed along a longitudinal edge of said elongated member.

3. Method according to claim 2, wherein said ductile iron-based material is cast iron.

4. The method of claim 1 wherein said metallic base element comprises a circular member and said cutting region is disposed about the circumference of said circular member.

5. Method according to claim 4, wherein said ductile iron-based material is cast iron.

6. The method of claim 2 wherein said metallic coating comprises a galvanically deposited coating with a Vickers hardness of at least 500 HV.

7. The method of claim 4 wherein said metallic coating comprises a galvanically deposited coating with a Vickers hardness of at least 500 HV.

8. The method of claim 2 wherein said boron nitride particles are approximately 0.3 to 1 mm.

9. The method of claim 4 wherein said boron nitride particles are approximately 0.3 to 1 mm.

10. The method of claim 8 wherein said boron nitride particles are approximately 0.5 to 0.8 mm.

11. The method of claim 9 wherein said boron nitride particles are approximately 0.5 to 0.8 mm.

12. The method of claim 2 wherein the thickness of said cutting region is less than the thickness of said base element.

13. The method of claim 4 wherein the thickness of said cutting region is less than the thickness of said base element.

14. The method of claim 12 wherein said boron nitride particles protrude outwardly beyond said base element.

15. The method of claim 13 wherein said boron nitride particles protrude outwardly beyond said base element.

* * * * *

UNITED STATES PATENT AND TRADEMARK OFFICE
CERTIFICATE OF CORRECTION

PATENT NO.  : 5,544,643
DATED       : August 13, 1996
INVENTOR(S) : Bauer et al.

It is certified that error appears in the above-indentified patent and that said Letters Patent is hereby corrected as shown below:

On the title page, item [54], and in column 1, lines 1 and 2, the title should be deleted, and substitute therefor --METHOD FOR SAWING DUCTILE IRON MATERIALS HAVING A CONCRETE LINING--.

Signed and Sealed this

Twenty-ninth Day of October 1996

*Attest:*

BRUCE LEHMAN

*Attesting Officer*          *Commissioner of Patents and Trademarks*